United States Patent [19]

Suzuki et al.

[11] 4,223,598
[45] Sep. 23, 1980

[54] ELECTRONIC AIR CLEANER FOR PASSENGER COMPARTMENT OF VEHICLE

[75] Inventors: Kazuhiko Suzuki, Yokosuka; Masazumi Sone, Yokohama, both of Japan

[73] Assignee: Nissan Motor Company, Limited, Japan

[21] Appl. No.: 28,727

[22] Filed: Apr. 10, 1979

[30] Foreign Application Priority Data

May 30, 1978 [JP] Japan ............................ 53-72353[U]

[51] Int. Cl.³ .......................... B60H 3/06; B03C 3/08; B03C 3/38
[52] U.S. Cl. ...................................... 98/2.11; 55/102; 55/126; 55/130; 55/145; 55/146; 55/385 B; 422/121
[58] Field of Search ................. 55/124, 126, 130, 133, 55/134, 137, 145, 146, 276, 279, 385 A, 385 B, 102; 98/2.11; 250/455, 504, 515; 422/121, 240, 241

[56] References Cited

U.S. PATENT DOCUMENTS

| | | | |
|---|---|---|---|
| 2,813,595 | 11/1957 | Fields | 55/137 |
| 3,509,697 | 5/1970 | Dewey et al. | 55/276 |
| 3,657,992 | 4/1972 | Minnick, Jr. | 55/279 |
| 3,804,942 | 4/1974 | Takashi et al. | 55/276 |
| 3,844,741 | 10/1974 | Dimitrik | 55/126 |
| 3,846,072 | 11/1974 | Patterson | 55/102 |
| 4,102,654 | 7/1978 | Pellin | 55/126 |
| 4,133,652 | 1/1979 | Ishikawa et al. | 55/279 |

*Primary Examiner*—David L. Lacey
*Attorney, Agent, or Firm*—Lane, Aitken, Ziems, Kice & Kananen

[57] ABSTRACT

An electronic air cleaner, having therein an electrostatic precipitator, is positioned close to an antenna of a radio receiver. The grounded plate electrodes of the precipitator are provided with a flat portion which lies between the precipitator proper and the antenna, so that electric noise wave generated by the precipitator and directing toward the antenna is blocked by the flat portion.

4 Claims, 6 Drawing Figures

ELECTRONIC AIR CLEANER FOR PASSENGER COMPARTMENT OF VEHICLE

FIELD OF THE INVENTION

The present invention relates in general to an electronic air cleaner and more particularly to an electronic air cleaner mounted in a passenger compartment of a motor vehicle for cleaning or purifying the air in the compartment. More specifically, the present invention is concerned with an improvement in construction of the electronic air cleaner for suppressing the radio-interference caused by it.

BACKGROUND OF THE INVENTION

For cleaning or purifying the air in the passenger compartment of a vehicle, many kinds of electronic air cleaners having therein a so-called electrostatic precipitator have been used. Some of these cleaners have therein air sterilizing means (such as an ultraviolet sterilizing lamp), air deodorizing means (such as an activated charcoal filter), and negative ion generating means for providing the passengers in the compartment with a more comfortable ride. However, in such electronic air cleaner, considerable amounts of electric noise waves radiate from the cleaner, especially from the section of the electrostatic precipitator thereof. Such noise waves interfere with other electric devices of the vehicle, such as a radio receiver, to a great degree. Especially, if such electronic air cleaner "A" (see FIG. 1) is set at a position close to an antenna "B" of the radio receiver, the interference by the noise becomes most critical. In fact, for achieving smooth air flow in the passenger compartment in the vehicle, the cleaner is designed to be set on a rear parcel shelf "C" even if the antenna of the radio receiver is attached to or embedded in a rear window panel "D" which is positioned close to the shelf "C", as is shown in FIG. 1.

OBJECTS OF THE INVENTION

It is therefore an object of the present invention to provide an improved electronic air cleaner which is designed and constructed to suppress radiation of electric noise wave therefrom.

According to the present invention, there is provided a vehicle having an electric device sensitive to an electric noise wave and an electronic air cleaner for cleaning air in a passenger compartment of the vehicle, the cleaner being positioned close to the sensitive electric device and comprising: a first group of grounded plate electrodes which are spaced parallel to each other, each of the grounded plate electrodes extending toward the sensitive electric device such that each space defined between any adjacent two of the grounded plate electrodes faces the sensitive electric device; a second group of electrodes juxtaposed in the first group of grounded plate electrodes such that each of the second group of electrodes is spacedly disposed between the adjacent two of said first group of grounded plate electrodes; and an electric power source is connected to both the first and second groups of electrodes for applying therebetween a high electric potential; wherein the first group of grounded plate electrodes having a flat section thereof which is connected to and positioned on the extending ends of the first group of grounded plate electrodes to substantially close the entrances of the spaces.

SUMMARY OF THE DRAWINGS

Other objects and advantages of the present invention will become clear from the following description when taken in conjunction with the accompanying drawings, in which.

DESCRIPTION OF THE EMBODIMENTS

Figure 1:
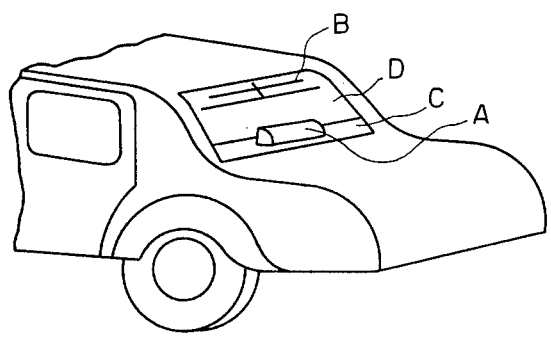
FIG. 1 is a partial sketch of a passenger motor vehicle having an electronic air cleaner set on a rear parcel shelf near a rear window panel to which an antenna of a radio receiver is attached.
Figure 2:
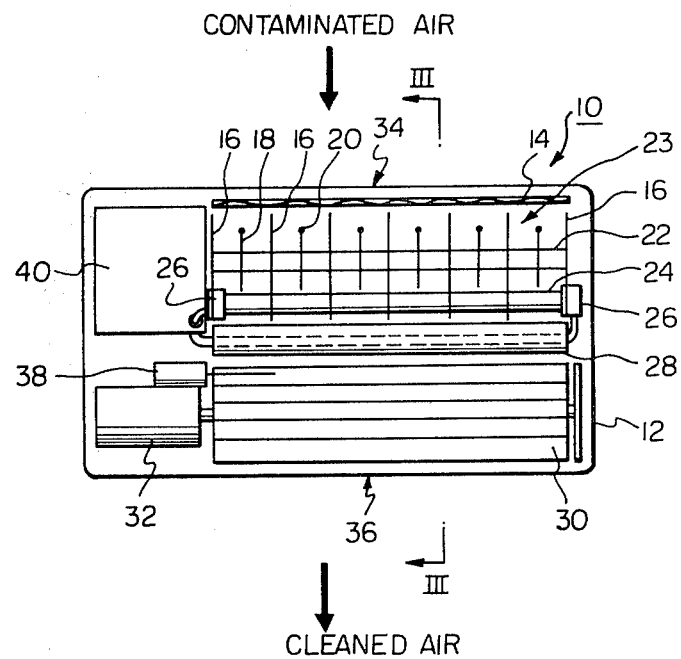
FIG. 2 is a plan view of a conventionally used electronic air cleaner with an upper lid removed.
Figure 3:
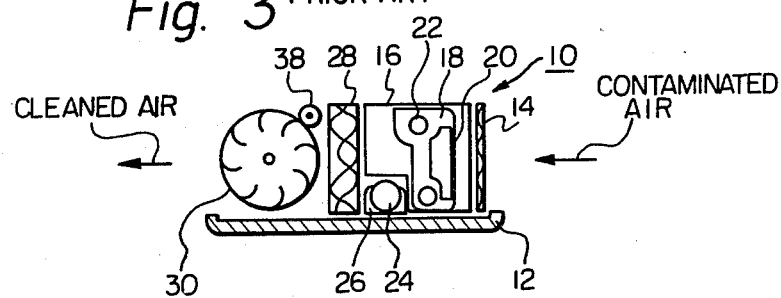
FIG. 3 is a sectional view taken along the line III—III of FIG. 2.

Referring to FIGS. 2 and 3, there is illustrated a conventionally used electronic air cleaner which is designed to be set in a passenger compartment of a vehicle.

In these figures, numeral 12 denotes a base member on which a cover or lid (not shown) is adapted to be set. Standing on one side of the base member 12 is a prefilter 14 of metal wire netting. The prefilter 14 is held at the grounded potential and removes coarse dust particles suspended in air flowing into the cleaner 10. Positioned inside the prefilter 14 are grounded parallel and equally spaced electrodes 16 (only three are numbered), each consisting of a conductor plate extending inwardly at right angles with respect to the prefilter 14, as is best shown in FIG. 2. A plurality of support plates 18 (only one is numbered) are juxtaposed within the grounded electrodes 16 such that each support plate 18 is spacedly disposed between the adjacent two of the grounded electrodes 16. These support plates 18 are also constructed of a conductive material. Supported by and connected to the support plates 18 are high voltage electrodes 20 (only one is numbered) which extend perpendicularly with respect to the base member 12, as is seen from FIG. 3. Designated by numeral 22 is an insulating rod by which the grounded electrodes 16 and the support plates 18 are suspended so as to be electrically insulated from each other. Although not shown in the drawings, the grounded electrodes 16 are electrically connected to each other and to the body of the vehicle. The high voltage electrodes 20 are electrically connected to each other. With this, a so-called electrostatic precipitator 23 is formed.

Positioned inside the support plates 18 and near the base member 12 is an ultraviolet sterilizing lamp 24 which is supported by sockets 26. A deodorizing device 28, including a metal wire net bag and activated charcoal or catalyzer in the bag, is placed at the rear of the ultraviolet sterilizing lamp 24. A cross flow fan 30 powered by an electric motor 32 is provided to take in the polluted air from an air inlet 34 and let out the cleaned or treated air to an air outlet 36. A negative ion generator 38 is positioned upstream of the fan 30. Designated by numeral 40 is an electric converter which supplies the electric devices such as the electrostatic precipitator 23, the sterilizing lamp 24, the electric motor 32 and the negative ion generator 38, with necessary electric power. For instance, the electric converter is designed to apply A.C. 500 V to the sterilizing lamp 24, D.C. +5 kV to the electrostatic precipitator 23 and D.C. −5 kV to the negative ion generator 38 by converting the direct current from a D.C. 12 V battery (not shown).

In operation, the contaminated or polluted air in the passenger compartment is directed, by the fan 30, to the inlet opening 34 and then passes through the prefilter 14 to remove coarse particles. The air, without the coarse dust particles, is then led to the electrostatic precipitator 23 where the remaining fine dust particles are charged on the principle of electrostatic dust collection and attracted to the grounded electrodes 16 to be arrested thereon. The air, thus without the coarse and fine dust particles, passes by the ultraviolet sterilizing lamp 24 for sterilization of the air and is then led to the deodorizing filter 28 for elimination of smell of the air. The deodorized air is then led to the negative ion generator 38 to be fed with the negative ions. The air thus cleaned and treated is then discharged from the outlet 36 of the cleaner 10 into the passenger compartment.

In the above-mentioned cleaner 10, however, the unwanted electric noise wave tends to leak out considerably from the cleaner 10 due to lack of sufficient shielding for the noise.

Figure 5:
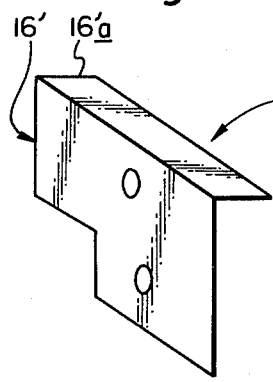
FIG. 5 is a perspective view of an element constituting part of the electrostatic precipitator section of FIG. 4.
Figure 4:
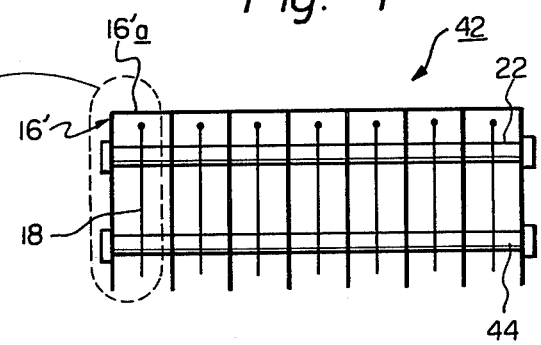
FIG. 4 is a view showing an electrostatic precipitator section which constitutes part of the electronic air cleaner of the present invention.

Referring to FIGS. 4 and 5, especially FIG. 4, there is shown an improved electrostatic precipitator 42 which constitutes part of an electronic air cleaner of the present invention. The electronic air cleaner of the invention is substantially the same as the aforementioned conventional cleaner 10 except for the construction of the electrostatic precipitator. Thus, the whole view of the subject cleaner is not presented.

The electrostatic precipitator 42 is arranged in the cleaner assembly of the invention in substantially the same manner as the afore-mentioned cleaner 10. In the invention, however, each of the grounded plate electrodes 16' has a flange 16'a at its upper end so as to have a generally L-shaped cross section, as is understood from FIG. 5. The flange 16'a extends throughout the entire width of the plate 16' as shown. As is shown in FIG. 4, the L-shaped grounded electrodes 16' are arranged in parrallel so that the flanges 16'a point in the same direction to be in entire contact with the shoulder sections of adjacent members thereof. Denoted by numeral 44 is an additional insulating rod which passes through the grounded electrodes 16' and the support plates 18 for suppporting the same. Thus, it will be appreciated that the flanges 16'a form a radio wave shield for blocking the noise wave directing outwardly toward the flanges 16'a. Now, it should be noted that the other noise waves directing forwardly and rearwardly from the precipitator 42 are blocked by the prefilter 14 and the deodorizing filter 28, respectively.

In setting the electronic air cleaner of the invention on the passenger vehicle, the cleaner is so arranged that an imaginary plane which includes the major surfaces of the flanges 16'a faces to the sensitive electric device, such as the antenna of the radio receiver. Thus, when the cleaner is set on the rear parcel shelf above which the antenna "B" attached to or embedded in the rear window panel "D", the cleaner is arranged such that the plane of the flanges 16'a lies between the electrostatic precipitator 42 and the antenna "B".

Figure 6:
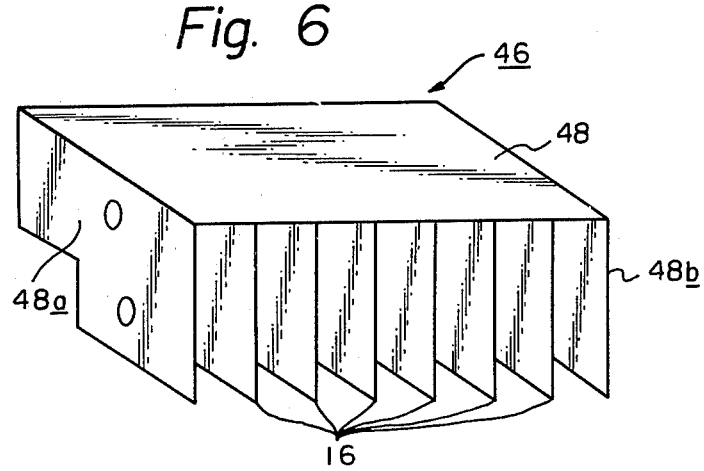
FIG. 6 is a perspective view of a modification of the electrostatic precipitator section of FIG. 4.

FIG. 6 shows a modification 46 of the grounded plate electrodes 42 of FIG. 4, which comprises a base section 48 with side wall sections 48a and 48b integral with the base section 48, and a plurality of plates 16 secured at their one ends to the base section 48, the plates 16 being the same in construction as the plates of FIG. 2.

Now, according to the present invention, the following merits and advantages are given in addition to the protection of the sensitive devices such as the radio receiver from the radio interference caused by the electrostatic precipitator.

(1) The provision of the flanges 16'a or the base section 48 will increase the dust collecting areas of the grounded electrodes. Thus, the dust particle collecting efficiency of the cleaner is improved, and (2) The presence of the flanges 16'a or the base 48 will prevent the operator from accidentally touching the dangerous high voltage electrodes 20.

What is claimed is:

1. A vehicle having an electric device sensitive to an electric noise wave and an electronic air cleaner for cleaning air in a passenger compartment of said vehicle, said cleaner being positioned close to the sensitive electric device and comprising a first group of grounded plate electrodes which are spaced parallel to each other, each of said grounded plate electrodes extending toward the sensitive electric device such that each space defined between any adjacent two of said grounded plate electrodes faces the sensitive electric device, a second group of electrodes juxtaposed in said first group of grounded plate electrodes such that each of said second group of electrodes is spacedly disposed between the adjacent two of said first group of grounded plate electrodes, and an electric power source connected to both the first and second groups of electrodes for applying therebetween a high electric potential, wherein said first group of grounded plate electrodes have a flat electrically conductive section which is connected to and lies on the extending ends of said first group of grounded plate electrodes to substantially close the entrances of the spaces.

2. A vehicle as claimed in claim 1, wherein said flat electrically conductive section of said first group of grounded plate electrodes comprises a flange formed on an end of each of said grounded plate electrodes.

3. A vehicle as claimed in claim 1, wherein said flat electrically conductive section of said first group of grounded plate electrodes is a metal plate.

4. A vehicle as claimed in claim 3, wherein said metal plate member is integral with two of said first group of grounded plate electrodes, said two being located respectively at both sides of said first group of grounded plate electrodes.

* * * * *